United States Patent [19]

Scherzer

[11] Patent Number: 4,709,781
[45] Date of Patent: Dec. 1, 1987

[54] SOUND-DAMPING AND HEAT-INSULATING COMPOSITE PLATE

[75] Inventor: Wilhelm Scherzer, Berndorf, Austria

[73] Assignee: Austria Metall Aktiengesellschaft, Braunau am Inn, Austria

[21] Appl. No.: 799,160

[22] Filed: Nov. 18, 1985

[30] Foreign Application Priority Data

Nov. 16, 1984 [AT] Austria .................. 3632/84

[51] Int. Cl.$^4$ .......................... E04B 1/82; B32B 15/06
[52] U.S. Cl. .................... 181/290; 181/294;
428/317.9; 428/319.1; 428/327; 428/465;
428/463; 156/338
[58] Field of Search ............ 428/327, 465, 463, 317.9,
428/319.1; 181/290

[56] References Cited

U.S. PATENT DOCUMENTS

| | | | |
|---|---|---|---|
| 2,165,296 | 7/1939 | Oass | 428/921 |
| 2,640,035 | 5/1953 | Brown et al. | 428/903.3 |
| 3,948,009 | 4/1976 | Bernhard | 181/290 X |
| 3,961,682 | 6/1976 | Dausch et al. | 181/290 |
| 4,594,292 | 6/1986 | Nagai et al. | 428/465 |

FOREIGN PATENT DOCUMENTS

| | | | |
|---|---|---|---|
| 0181627 | 5/1986 | European Pat. Off. | 428/465 |
| 1222610 | of 1960 | France | 428/465 |
| 1311087 | of 1962 | France | 428/465 |

OTHER PUBLICATIONS

B. F. Goodrich, Information Bulletin, 7/1958, #758-1, Index 7030.

Primary Examiner—P. C. Ives
Attorney, Agent, or Firm—Karl F. Ross; Herbert Dubno

[57] ABSTRACT

A sound-damping composite panel with elastic properties is provided by disposing a prefabricated porous core made from rubber granules or scrap, e.g. rubber tire scrap, between a pair of metal layers or sheets, e.g. of aluminum, and adhesively bonding the metal layers to the core under heat and pressure.

7 Claims, 2 Drawing Figures

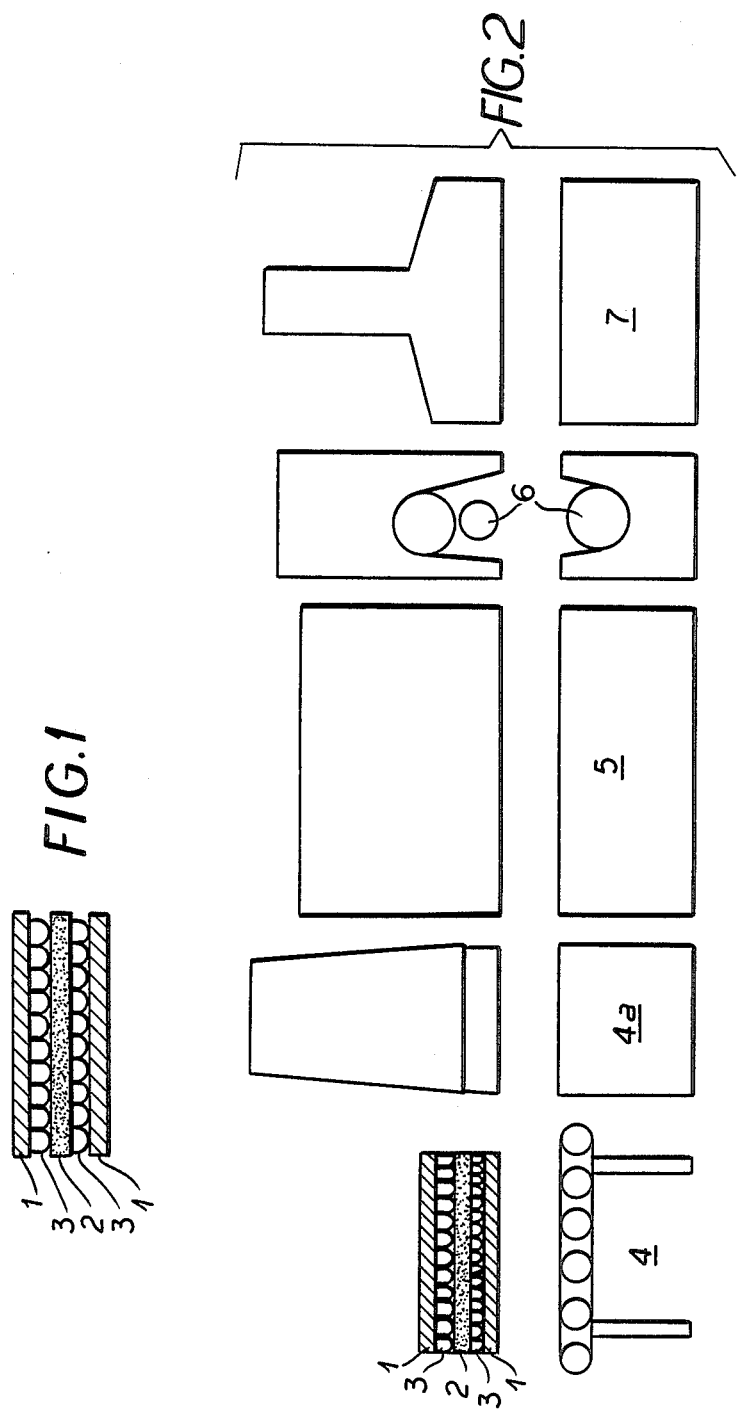

SOUND-DAMPING AND HEAT-INSULATING COMPOSITE PLATE

FIELD OF THE INVENTION

My present invention relates to a composite plate structure and, more particularly, to a composite plate or panel capable of absorbing vibration and shock waves and thus having accoustic-damping and vibration-damping effects while, at the same time, possessing low thermal conductivity and thus acting as a thermal barrier or thermal insulation. The invention also relates to a method of making such a composite plate.

BACKGROUND OF THE INVENTION

Metal-elastomer composites are widely in use for a variety of purposes and have various constructions and configurations. For example, it is known to provide metal-elastomer composites which can comprise a pair of metal bodies, e.g. plates or sheets, which have a solid elastomer body vulcanized to the adjoining surfaces of the metal sheets.

Such composites are widely in use as shock absorbers, as vibration-absorbing supports or barriers, as sound-damping partitions and elements, and even as elastomer springs to provide restoring and oscillation-damping phenomena for vibrations and oscillations transverse to the sandwich or composite structure and even in planes parallel to the aformentioned surfaces.

As is well known with such composites, the relative movements of the two metal members are imparted to the solid elastomeric body which is thereby subjected to torsion, tension, compression and/or shear and which elastically deforms under such stresses and can thereby transform such vibrations and oscillations to heat by internal molecular movement within the elastic limits of the body.

While such composites are highly advantageous for sound and vibration damping and as elastomer springs, and are comparatively inexpensive because they require only vulcanization of the metal surfaces of the solid elastomer body sandwiched between them, they are not satisfactory as heat-insulating members or as thermal barriers, because they have poor heat-lagging properties.

That is not to say that there are not composite structures with heat-lagging or thermal-insulation or heat-barrier properties. For example, composite plates utilizing synthetic resin cores which are generally inelastic or at most have only a fraction of the elastomeric character of rubber, can be provided as heat-barrier or insulating layers.

These composites, however, have poor sound-damping properties and heat resistance.

OBJECTS OF THE INVENTION

It is, therefore, the principal object of the present invention to provide an improved composite structure whereby the drawbacks outlined above are obviated.

A more specific object of this invention is to provide an improved composite plate of the type in which an elastomer is sandwiched between a pair of metal members and which has excellent sound-damping, vibration-damping and oscillation-damping properties, but also has excellent heat-barrier or heat-lagging (thermal insulation) properties.

Still another object of the invention is to provide a composite structure which is capable of use as an elastomer spring but which has high heat-resistance and thermal-insulation capabilities.

SUMMARY OF THE INVENTION

These objects and others which will become apparent hereinafter are attained, in accordance with the present invention, with a metal/elastomer composite which comprises a porous elastomer core composed of an interbonded elastomer, namely rubber particles, which is sandwiched between a pair of metal layers to which this core is bonded, the particles of the core being composed of rubber scrap or granules.

Because the porosity of the core can be comparatively high, and the bonding of the particles together can be a minimum so that the particles need merely be retained in a coherent layer or body, the result is a relatively light weight plate which has excellent sound and heat-damping properties and, because of the comparatively high pore volume minimizing thermal conduction, the heat resistance of the panel is high and indeed an important utility of the composite plate of the invention is as a fire barrier in structures.

The rubber granules are preferably ground up used pneumatic vehicle tires and these particles can be bonded by an appropriate bonding agent or adhesive, e.g. a small quantity of a polyacrylate film, into a porous web having a thickness of 4 to 10 mm which can then be sandwiched between a pair of metal cover layers or sheets, e.g. of iron or aluminum. The sheets can be bonded to the web.

BRIEF DESCRIPTION OF THE DRAWING

The above and other objects, features and advantages of the present invention will become more readily apparent from the following description, reference being made to the accompanying drawing in which:

FIG. 1 is a diagrammatic cross section through a composite plate embodying the principles of the invention; and FIG. 2 is a diagrammatic elevational view of an apparatus for producing the composite plate of the invention and illustrating the fabrication thereof.

SPECIFIC DESCRIPTION

In FIG. 1, in which the dimensions of the various layers have not been shown to scale, it will be apparent that a composite metal/elastomer body can comprise a pair of metal cover plates 1 which can be iron or steel or aluminum sheets, e.g. of a thickness of 4 to 10 mm, between which a web 2 previously formed of porous rubber scrap is sandwiched so that these sheets coat the elastomer core.

The layer 2, which can also have a thickness of say 4 to 10 mm, can be formed by simply grinding worn pneumatic vehicle tires or by milling such tires after cryogenically cooling them to embrittle the tires. The elastomer particle size can be from 50 microns to say 1 mm. The particles may be spray-coated with any suitable bonding agent, e.g. a polyacrylate which is used in a minimum quantity sufficient to enable the elastomer particles to adhere to one another without material reduction porosity. The pore volume can range between 10 and 80% of the volume of the layer depending upon the size of the particles used.

As can be seen from FIG. 2, the metal sheets 1, whose external surfaces can be previously lacquered, anodically oxidized or otherwise decorated, e.g. with a decorative foil, have their juxtaposed faces coated with a thermally activated adhesive which can be applied as a foil to opposite sides of the rubber scrap core 2. The heat-activated foils 3 can have different adhesives on their opposite sides, being provided with a metal adhesive on the side facing the metal sheet and an elastomeric adhesive on the side facing the rubber core.

The stack is assembled at a feed station 4 and then passed through a preliminary press 4a before the compressed stack is introduced into a continuous heating station 5 through which the laminated body is passed continuously. In the heating station 5, the stack is heated to a temperature just slightly above the thermally active temperature of the adhesive foils 3. The stack is then pressed between two heated rubber rollers 6 in a compression stage which applies a linearly advancing compression and heating effect to the laminate to effectively bond the thermally activated surfaces to the metal sheets and the core.

The panel is then passed through a cooling station 7.

The resulting plates have been found to have high elasticity, are resistant to bending and are amenable to attachment to supports and the like by screws threaded into the composite and rivets traversing same. The panel is corrosion-resistant and can be used as facing members wherever high acoustic damping and fire retardancy is desired, and is especially effective for wall, roof and floor coverings. The high resilience allows them to be used with excellent effect for table tennis tables, switch cabinet linings, air conditioning ducts, door coverings, machine enclosures and transport structure.

I claim:

1. A sound-damping composite body consisting essentially of two metal cover layers and a porous core layer, said core layer being positioned between the two metal cover layers and bonded to each of said metal layers, said core layer being composed of interbonded particles of rubber forming pores between them.

2. The body defined in claim 1 wherein said particles are rubber scrap.

3. The body defined in claim 1 wherein said particles are rubber granules.

4. The body defined in claim 1 further comprising an adhesive foil between said core and said respective metal layers, said adhesive foil having a first surface adjacent a respective metal layer whereon is formed a metal bonding adhesive affixed to said respective metal layer and a second surface of said foil adjacent said core wherein is formed a rubber bonding adhesive affixed to said core.

5. The body defined in claim 1 wherein said metal layers are bonded to said core by a thermally activated adhesive under heat and pressure.

6. The body defined in claim 1 wherein said particles are milled old pneumatic tire scrap.

7. The body defined in claim 1 wherein said particles are interbonded in said core with an adhesive.

* * * * *